(12) United States Patent
Chen et al.

(10) Patent No.: US 9,954,390 B2
(45) Date of Patent: Apr. 24, 2018

(54) BALLAST WITH BATTERY BACKUP

(71) Applicant: Fulham Company, Ltd., Kowloon (HK)

(72) Inventors: Xiaohong Chen, Shanghai (CN); David Ci, Weihai (CN)

(73) Assignee: Fulham Co., Ltd., Kowloon (HK)

( * ) Notice: Subject to any disclaimer, the term of this patent is extended or adjusted under 35 U.S.C. 154(b) by 186 days.

(21) Appl. No.: 14/404,632

(22) PCT Filed: May 30, 2013

(86) PCT No.: PCT/IB2013/001287
§ 371 (c)(1),
(2) Date: Nov. 30, 2014

(87) PCT Pub. No.: WO2013/179134
PCT Pub. Date: Dec. 5, 2013

(65) Prior Publication Data
US 2015/0380983 A1    Dec. 31, 2015

Related U.S. Application Data

(60) Provisional application No. 61/653,372, filed on May 30, 2012.

(51) Int. Cl.
*H02J 9/02* (2006.01)
*H02J 9/06* (2006.01)
*H05B 41/285* (2006.01)

(52) U.S. Cl.
CPC ................... *H02J 9/02* (2013.01);
*H02J 9/06* (2013.01); *H02J 9/065* (2013.01);
*H05B 41/2855* (2013.01)

(58) Field of Classification Search
CPC .... H02J 9/02; H02J 9/06; H05B 41/16; H05B 18/28
(Continued)

(56) References Cited

U.S. PATENT DOCUMENTS 3,919,618 A    11/1975    Coleman et al.
4,682,078 A *  7/1987    Pascalide ................ H02J 9/065
                                                                     307/64
(Continued)

FOREIGN PATENT DOCUMENTS

CN    2814876 Y    9/2006
CN    201430719 Y    3/2010
(Continued)

OTHER PUBLICATIONS

Second Office Action for corresponding Chinese Patent Application No. 201380040286.X, 23 pp. (Including English translation), (dated Oct. 21, 2016).
(Continued)

*Primary Examiner* — Jared Fureman
*Assistant Examiner* — Win Htun
(74) *Attorney, Agent, or Firm* — Womble Bond Dickinson (US) LLP

(57) ABSTRACT

An emergency battery backup ballast is configured so that it can be fully assembled but in a dormant condition. The emergency battery backup ballast commences normal operation when AC power is supplied to the ballast for the first time. Then if the AC power is removed, one or more lamps (56) which are connected to the output of the ballast can be powered by the battery (54).

15 Claims, 3 Drawing Sheets

(58) Field of Classification Search
USPC ..... 307/23; 361/216, 600, 641, 674; 315/86, 315/160, 161, 362, 247, 291, 64
See application file for complete search history.

(56) References Cited

U.S. PATENT DOCUMENTS

| | | | |
|---|---|---|---|
| 5,493,181 A | 2/1996 | Shackle et al. | |
| 5,811,938 A * | 9/1998 | Rodriguez | H02J 9/02 315/171 |
| 5,925,990 A * | 7/1999 | Crouse | H05B 41/2855 315/127 |
| 6,005,354 A * | 12/1999 | Houk | H05B 41/2855 315/209 R |
| 6,040,661 A * | 3/2000 | Bogdan | H05B 41/295 315/224 |
| 6,094,016 A * | 7/2000 | Luger | H05B 41/36 315/149 |
| 6,111,368 A * | 8/2000 | Luchaco | H05B 41/2853 315/224 |
| 6,502,044 B1 * | 12/2002 | Lane | H02J 7/0029 363/101 |
| 6,657,401 B2 * | 12/2003 | Kominami | H05B 37/0263 315/291 |
| 6,876,159 B1 * | 4/2005 | Wu | H05B 41/2821 315/209 R |
| 7,084,582 B2 | 8/2006 | Buonocunto | |
| 7,109,668 B2 * | 9/2006 | Pogodayev | H05B 41/245 315/224 |
| 7,868,560 B2 * | 1/2011 | Gong | G09G 3/3406 315/209 R |
| 7,880,391 B2 | 2/2011 | Bakre et al. | |
| 7,965,494 B1 | 6/2011 | Morris et al. | |
| 2005/0029966 A1 * | 2/2005 | Buonocunto | H02J 9/065 315/291 |
| 2007/0217093 A1 * | 9/2007 | Xue | H02M 1/10 361/18 |
| 2008/0150447 A1 * | 6/2008 | Shackle | H05B 41/36 315/247 |
| 2009/0322228 A1 * | 12/2009 | Bakre | H05B 41/2855 315/86 |
| 2010/0213866 A1 * | 8/2010 | Zhai | H05B 41/2851 315/291 |

FOREIGN PATENT DOCUMENTS

| | | |
|---|---|---|
| CN | 101715271 A | 5/2010 |
| CN | 201536269 U | 7/2010 |
| CN | 101801131 A | 8/2010 |
| CN | 202082783 U | 12/2011 |
| EP | 2 023 463 A2 | 2/2009 |
| EP | 2 023 693 A2 | 2/2009 |
| GB | 2 269 062 A | 1/1994 |
| JP | 05-199665 A | 8/1993 |

OTHER PUBLICATIONS

PCT Written Opinion of the International Searching Authority for PCT Counterpart Application No. PCT/IB2013/001287, 5 pp., (dated Sep. 19, 2013).
PCT Notification Concerning Transmittal of International Preliminary Report on Patentability (Chapter I of the Patent Cooperation Treaty) for PCT Counterpart Application No. PCT/IB2013/001287, 7 pp., (dated Dec. 11, 2014).
European Patent Office Communication enclosing extended European Search Report for corresponding European Patent Application No. 13796941.6, 8 pp., (dated Mar. 22, 2016).
Li, Xiaoyan, International Search Report, PCT/IB2013/001287, dated Sep. 19, 2013, 5 pages, ISA/CN.
First Office Action for corresponding Chinese Patent Application No. 201380040286.X with English translation containing Chinese Search Report in English, 31 pp., (dated Jan. 14, 2016).
Third Office Action for corresponding Chinese Patent Application No. 201380040286.X, 3 pp., (dated Jul. 3, 2017).
CE+UL Universal Emergency Module (184010), Phenix Lighting Co., Ltd., Xiamen, China, 1 page (dated May 29, 2012).
Fourth Office Action for corresponding Chinese Patent Application No. 201380040286.X with full English Translation, 9 pp., (dated Jan. 29, 2018).

* cited by examiner

BALLAST WITH BATTERY BACKUP

CROSS REFERENCE TO RELATED APPLICATIONS

This application is a National Stage of International Application No. PCT/IB2013/001287, filed May 30, 2013, which claims priority to U.S. Provisional Application No. 61/653,372, filed May 30, 2012.

BACKGROUND

Field

These inventions relate to ballasts and ballasts with battery backup circuits, for example ballasts with battery backup circuits integral with or contained within the main ballast package.

Related Art

Battery backup ballasts are mandated by building codes in many geographic areas. They have the function that if there is ever a power outage, energy from a storage battery will provide some light to the facility, usually for a period of two hours, to allow people to safely exit the facility.

Conventionally these emergency battery backup ballasts are shipped with the battery disconnected. When they are assembled into a fixture, the final assembly is usually done actually on the premises which are to be serviced. With the fixture disassembled, the battery is connected to the ballast. Since the fixture is disassembled at this stage, usually with the lamps removed, the emergency ballast will start trying to strike a non-existent lamp, which may involve the production of starting voltage pulses of as much as 1500V. The subsequent assembly of the fixture can be a dangerous procedure which is routinely done by a licensed electrician. There is a need for a battery backup product which has the property that it can be shipped fully assembled, and only when it has been once connected to a power circuit and the power has been applied does it commence its normal emergency lighting function.

U.S. Pat. No. 5,811,938 describes a battery backup ballast which has a battery to provide power to light one of the lamps in case of emergency. However the product activates as soon as the battery is connected, and in addition the power applied to the lamp is DC, which seriously degrades the lamp over even a short period of time.

U.S. Pat. No. 6,876,159 describes the use of AC power to operate lamps in emergencies using AC, however this circuit will commence trying to start the lamps as soon as the battery is connected.

U.S. Pat. No. 7,084,582 describes a battery backup ballast which runs the lamps using AC, and also provides a universal input voltage feature which allows the product to operate off any line voltage from 120V to 277V.

U.S. Pat. No. 7,880,391 shows a battery backup ballast incorporating a delay between the change of AC power from on to off and the triggering of emergency lighting operation, so that the lights will not flash rapidly on and off if the power line voltage fluctuates noisily.

U.S. Pat. No. 7,965,494 connects the ballast and the battery with a set of connectors that can be snapped together, facilitating the changing of either the ballast part or the battery part of a fixture.

SUMMARY

Embodiments of the inventions provide a ballast that includes a battery backup where the ballast and battery backup can be shipped from the factory completely assembled and ready to use, thus avoiding expensive bulky connectors and careful plugging in of the battery at the last minute accompanied by the production of dangerous lamp ignition voltages. The ballast and battery backup ballast and battery can all be placed in a single enclosure and assembled, stored, shipped, placed in a fixture and started just as any ballast would be, and still operate as intended without any special assembly or setup requirements.

In one example, a method and an assembly of a ballast and a battery backup for the ballast includes a control circuit for keeping the battery from trying to power a load, for example a lamp, until the assembly is first connected to a line voltage. In one example, at least one circuit between the battery and a lamp keeps power from the lamp, for example until the assembly is first connected to a line voltage. In another example, the at least one circuit may include one or more transistors that remain off until the assembly is first connected to a line voltage. In a further example, the at least one circuit includes a storage or reservoir device or circuit having a first state before line voltage is applied and having a second state after line voltage is applied. In one configuration, the at least one circuit is a controllable inverter, and the storage or reservoir device is a capacitor. Other devices or circuits may serve the purpose of the storage or reservoir device. In one configuration, the capacitor is a relatively large capacitor, and in one example a 100 µF capacitor. In these configurations described in this paragraph with a storage or reservoir device or circuit, the storage or reservoir device or circuit can be in the first state, for example discharged capacitor, during assembly, storage, shipping or other handling of the ballast, or a fixture to which the ballast is attached. The storage or reservoir device or circuit can remain in the first state even after installation of a final fixture, for example a lighting fixture, and up to the point where the final fixture is connected to a line voltage, for example for normal operation. Thereafter, the ballast and a battery backup for the ballast can operate as intended for providing power to a load, for example a lamp, either from the line voltage, or in emergencies through the battery backup.

In a further example, a method and an assembly of a ballast and a battery backup for the ballast includes a circuit that controls or keeps battery power from a load, for example a lamp, until the assembly is first connected to a line voltage, after which a control circuit allows charging of the battery and normal operation of the ballast to power one or more lamps. In one example, the control circuit includes at least one relay for controlling connection and disconnection of the ballast circuit from line voltage. In another example, the control circuit includes at least one relay for switching the lamp or lamps from the ballast circuit to the battery backup circuit. In a further example, for example where the ballast powers a plurality of lamps, the control circuit connects only one lamp to the battery backup circuit. In another example, current operating a first component, for example a relay, for switching the lamp or lamps from the ballast circuit to the battery backup circuit also operates a second relay for connecting and disconnecting the ballast circuit from line voltage. In a further example, the first and second relays in the immediately-preceding example are operated substantially simultaneously. In a further configuration, operation of one or more relays is combined with operation of a storage or reservoir device or circuit that controls current from a battery backup to one or more lamps. For example, if one or more relays is operated based on the presence or absence of line voltage, the storage or reservoir device or circuit can also be operated as a function of the presence or absence of line voltage. In one configuration, if line voltage is present and the ballast is connected to the line voltage, the storage or reservoir device or circuit can be charged based on the presence of the line voltage. In another configuration, if line voltage is lost and the ballast is disconnected from the line voltage, the storage or reservoir device or circuit can start to discharge.

In another example, a live battery having a charge is connected into a ballast circuit having a battery backup circuit at a time when the ballast circuit is disconnected from line voltage. In one example, the battery is prevented from applying power to a load circuit, for example a lamp output circuit. In another example, the battery remains charged while the assembly of the battery and ballast circuit is configured, stored, shipped, assembled with other devices such as fixtures, and installed in a facility such as a building, or other structure. At one or more or all of these times, the battery is substantially prevented from applying power to a load circuit until a line voltage is applied to the assembly. Thereafter, according to one configuration, the load can be driven by the ballast circuit while line voltage is applied to the assembly, and at times when the line voltage is lost or goes below a threshold, the load can be driven by a backup circuit in the assembly with the battery. In one configuration, a backup circuit, for example one that includes a controllable inverter, includes a storage or reservoir device or circuit that has a first state, for example during assembly, storage, shipping and installation, up to the point of connection to a line voltage, and has a second state after connection to line voltage. When in the first state, the backup circuit in the assembly with the battery is configured to not operate or to be dormant, and when in the second state, the backup circuit in the assembly allows the battery to drive at least part of the load.

In a further example, a live battery having a charge is connected into a ballast circuit to form an assembly having a battery backup circuit, wherein the battery backup circuit is kept or remains inactive until a line voltage is applied to the assembly. With this configuration, the assembly can be packaged, stored, shipped, installed with other equipment such as light fixtures, or installed in structures including fixtures such as light fixtures, all without the battery discharging to any appreciable extent, or all without the battery being allowed to connect to a load output circuit. In this configuration, the battery backup circuit is kept in a dormant configuration. Thereafter, line voltage can be applied to the assembly, which then activates the backup circuit so that it is no longer in a dormant configuration. In one example, the backup circuit can include a reservoir or storage device having a first state when the backup circuit is in the dormant configuration, and having a second state when the backup circuit is no longer dormant. For example, the reservoir or storage device can be a capacitor, and wherein the capacitor is in a discharged state while the backup circuit is in its dormant configuration. In the example of a capacitor, the capacitor is in a second state when it is charged, in which case the battery backup circuit can be used to provide backup power to a lamp.

In another example of a ballast assembly and method, a ballast assembly having a battery backup circuit is configured so that if a battery was connected into the backup circuit of the assembly, and the ballast assembly was not connected to a line voltage, no connection could be made between the battery and a lamp output circuit without a line voltage having been first connected to the assembly. With an assembly having such characteristics, the assembly, with or without the battery connected into the battery backup circuit, can be assembled, stored, shipped, mounted in a fixture, or connected into an installation without the battery, once connected into the battery backup circuit, being able to connect to a lamp output circuit before line voltage is connected to the assembly. With this configuration, a charged battery, for example a fully charged battery, can be connected into the battery backup circuit at any stage of the process without fear of the battery trying to start a non-existent lamp, or start a lamp and discharge the battery before line voltage is connected. Even if the assembly, or a fixture to be operated by the assembly, is fully installed and ready to operate, a backup battery, either installed at that time or at any time prior thereto would not be able to apply current to a lamp output circuit until line voltage is applied to the assembly. In one example of such a configuration, a voltage on a battery charger circuit is used to determine whether or not a line voltage is applied to the assembly. Prior to applying a line voltage, a storage device in the assembly is configured to be, and remains, in a first state, such as a discharged state. As long as the storage device remains in the first state, any battery connected into the battery backup circuit will not be able to apply a current to a lamp output circuit. In another configuration, a voltage on a battery charger circuit is used to operate one or more relays for connecting and disconnecting components in the assembly. For example, a relay can be used to disconnect a main ballast circuit from line voltage until such time as the voltage in the battery charger circuit reaches a threshold. In another example, a relay can be used to connect and disconnect a battery backup circuit from a lamp output circuit. Additionally, both relays can be controlled through the voltage in the battery charger circuit. In a further example, a hysteresis circuit can be used in conjunction with a battery charger circuit to set a voltage level in the battery charger circuit, which can then be used to control one or more of a relay or plurality of relays, and a battery backup circuit. In one configuration, components in the hysteresis circuit, for example a transistor and resistor combination, are used to set voltage levels in the battery charger circuit. In any of the examples disclosed herein, application of the battery backup circuit, or operation of the circuit generally can be facilitated by using no more than two relays, or two or fewer relays.

In another example of a method and an assembly having a ballast circuit and a battery backup circuit, a battery backup circuit is configured to receive a battery, for example a charged battery, which would be electrically isolated from a lamp output circuit until such time as line voltage is connected to the assembly. In one configuration, the battery backup circuit includes a storage device, reservoir or other component or circuit that is charged or becomes activated when the assembly is connected to a power line. In another example, power from the battery backup circuit can be used to connect and disconnect one or more components in the assembly. In one example, a component that can be connected or disconnected includes the main ballast for the assembly. In another example, one or more components that can be connected and disconnected include one or more lamps driven through a lamp output circuit. Other components in the assembly can be operated as a function of a voltage in the battery charger circuit. In one or more of these configurations, the voltage in the battery charger circuit can be discrete voltages as determined by a control in the battery charger circuit. In one example, the discrete voltages can be approximately 6 or 7V on the one hand and 15 or 16V on the other hand. In another example, the discrete voltages in the battery charger circuit can be set by way of a hysteresis circuit coupled to the battery charger circuit. In any of these configurations, the battery backup circuit may include a circuit that remains inactive until the first time that a line voltage is coupled to the assembly. In another example, a storage device in the battery backup circuit remains in a first state until line voltage is connected to the assembly, before which any backup battery connected into the backup circuit cannot be connected to a lamp output circuit.

In a further example of apparatus and methods described herein, an emergency ballast is described with a battery charger with a hysteresis circuit to control the battery charger. Voltages in the battery charger can be used to connect and disconnect components in the assembly, and can also be used to control operation of a battery backup circuit, for example an inverter circuit in the backup circuit. In another example, a hysteresis circuit in a battery backup circuit can be used to apply settings to the battery charger circuit, for example to set voltages in the battery backup circuit. In a further configuration, the hysteresis circuit can be used to set voltages in the battery charger, which voltages can then be used to connect and disconnect components in the assembly, control an inverter circuit in the battery backup circuit, control relays, and serve other functions. In one configuration, the voltages used from the battery charger are discrete voltages.

In another example of a method and a ballast assembly having a battery backup circuit, part of the battery backup circuit may include a storage device, reservoir or other similar circuit configured to detect a voltage, for example in a battery charging circuit, which detection is then used to turn on or off an inverter circuit in the battery backup circuit. In one configuration, the storage or other circuit remains inactive at all times until a line voltage is coupled to the assembly, at which time the storage or other circuit is activated to operate under normal operating conditions. Thereafter, under normal operating conditions, the storage or other circuit can be used to turn on and off a circuit in the battery backup circuit, for example an inverter circuit. In one example, the storage device may be a capacitor, which is charged when line voltage is first connected to the assembly. When a voltage decreases below a threshold, for example as determined by a voltage level in a battery charger, the capacitor will discharge, turning on the inverter circuit so that the inverter circuit can be used to power one or more lamps in a lamp output circuit.

These and other examples are set forth more fully below in conjunction with drawings, a brief description of which follows.

DETAILED DESCRIPTION

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Examples of circuits and of methods of making and using the circuits are described. Depending on what feature or features are incorporated in a given structure or a given method, benefits can be achieved in the structure or the method. For example, circuits using a hysteresis circuit may achieve better circuit change over when power is lost or regained. They may also demonstrate better reliability. Additionally, some circuit configurations may also benefit from lower-cost, especially if they can be combined in a single ballast can.

These and other benefits will become more apparent with consideration of the description of the examples herein. However, it should be understood that not all of the benefits or features discussed with respect to a particular example must be incorporated into a circuit, component or method in order to achieve one or more benefits contemplated by these examples. Additionally, it should be understood that features of the examples can be incorporated into a circuit, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

It should be understood that terminology used for orientation, such as front, rear, side, left and right, upper and lower, and the like, are used herein merely for ease of understanding and reference, and are not used as exclusive terms for the structures being described and illustrated.

Figure 1:
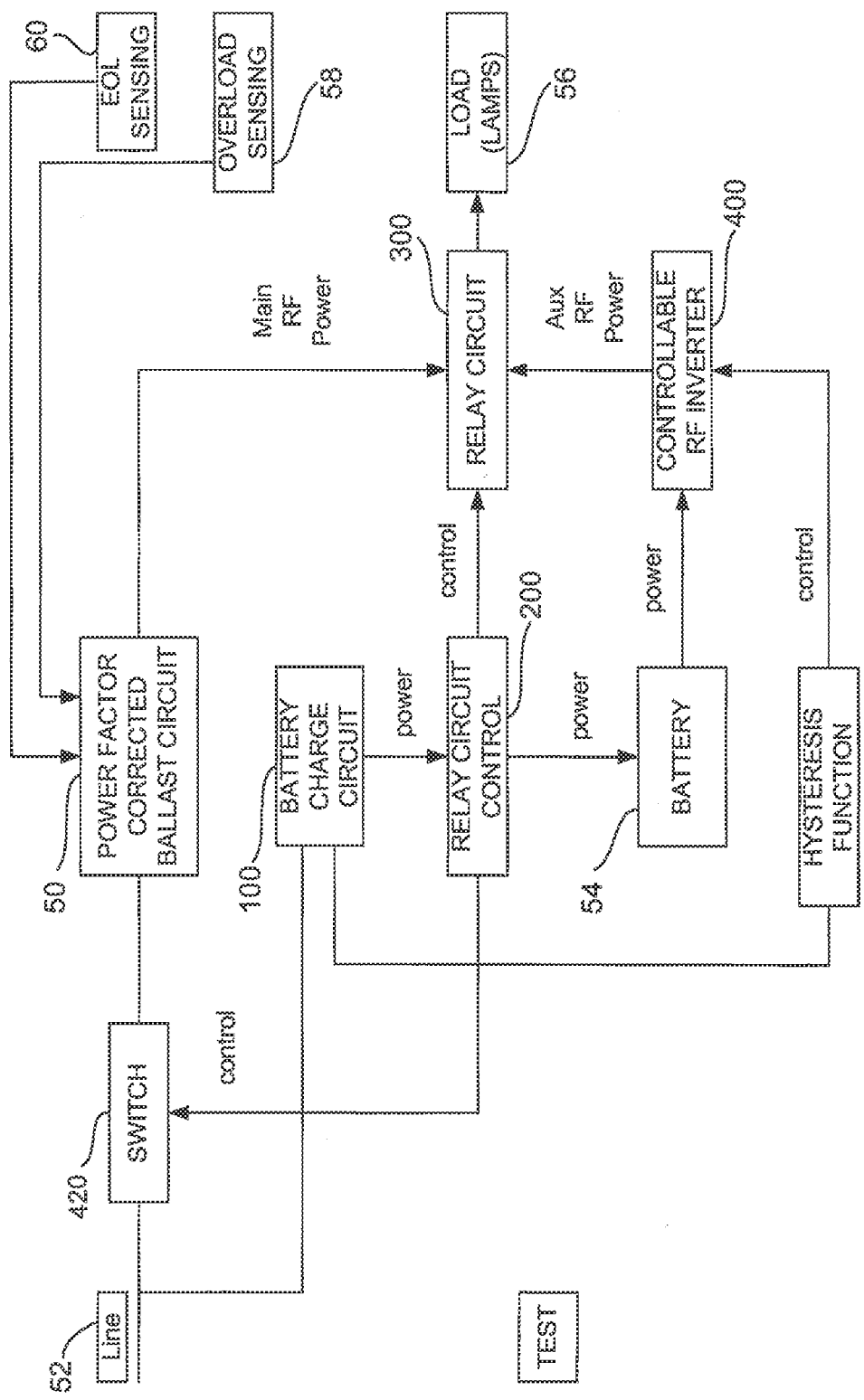
FIG. 1 is a schematic and block diagram of a circuit for allowing a backup battery be connected in a ballast circuit charged and ready for operation but dormant until the ballast is connected to a line voltage.

FIG. 1 shows a block diagram of one embodiment of the inventions. The power factor corrected ballast circuit 50 is a conventional ballast circuit made using the L6585D ballast control chip. The operation of this circuit is described in a commonly-available data sheet L6585D. This circuit provides the functions of a universal input 20 voltage power factor corrected boost plus a series resonant, parallel loaded stage for driving the lamps. The ballast 50 is powered through a switch (400 described more fully below) by line voltage 52.

The battery charger circuit 100 is a standard application of the OB2535 battery charger chip, the data sheet for which is also commonly available and incorporated herein by reference. The battery charger circuit 100 is coupled to line voltage 52. The battery charger circuit 100 provides an output that can also be used by a battery backup circuit, for example a controllable inverter circuit 200, described below. For example, the battery charger circuit 100 output may be used to determine when the battery backup circuit is turned on. In one of the examples herein, the battery charger circuit provides a beneficial set of voltages that can be used reliably to decide whether or not to turn on the battery backup circuit and when, e.g. at what voltage level. Because the battery charger circuit can provide two relatively reliable and discreet voltages, they can be used to determine when to turn on and off the battery backup circuit. Additionally, the battery charger circuit can be used to provide a voltage sufficient to operate one or more relays for switching components in and out of one or more circuits.

A hysteresis circuit can also be used, if desired, in conjunction with the battery charger circuit to set voltages at which the battery charger circuit will operate. For example, the hysteresis circuit can be used to determine the status of the line voltage. The hysteresis circuit can also be used to set a voltage level on the battery charger circuit, in one example based on the status of the line voltage sensed by the hysteresis circuit, and that voltage level on the battery charger circuit can be used to turn on or to turn off the controllable inverter circuit 400. In one example, the hysteresis circuit 500 can sense the line voltage and change the battery charging circuit voltage level (for example to about 6-7V) when the line voltage is approximately 72V, and change the battery charging circuit voltage level (for example to about 16-17V) when the line voltage is approximately 102V. With this process (setting the battery charging circuit at two discreet voltage levels or outputs using the hysteresis circuit), the controllable inverter circuit 400 can be triggered at two different times, for example to reduce the possibility of unstable transitions and to have the controllable inverter transition at more reliable ballast states. Using voltage levels from the line voltage status allows the ballast to use a quantifiable line voltage state that results in a relatively reliable operation. Also, setting the two voltage levels at which the hysteresis circuit 500 causes the change in the state of the battery charging circuit allows the battery charging circuit to produce the two discreet voltage levels usable by the controllable inverter 400 in transitioning from one state to another state.

The battery charger circuit 100 charges a battery 54 through a relay control circuit 200, which uses the voltage output from the battery charger circuit 100 to control operation of a relay circuit 300, which may for example include one or more relays.

The controllable RF inverter 400 runs off the 6.2V battery, and can be switched on and off by a signal from the battery charger circuit 100. It is a parallel resonant current fed self oscillating inverter, and may include a storage or reservoir device or circuit (described more fully below). The storage or reservoir device or circuit in one example includes a capacitor, and the capacitor has a first state, for example during assembly, storage, shipping and/or installation of the ballast and battery backup circuit. In one example, the first state has the capacitor discharged, and the capacitor has a second charged state. In the capacitor first state, the controllable RF inverter 400 keeps the battery from powering a load or output circuit, and is in a dormant configuration, while in the second state, the controllable RF inverter 400 allows the battery to power a load coupled to the output circuit of the assembly. The controllable RF inverter 400 has three states 1) off (the system is operating normally) 2) on (there has been a power outage and the system is operating off the battery) and 3) dormant (in which the battery is connected and charged but the inverter remains off and dormant until after the battery charger has been energized once by a connection to the power line. The relay circuit control 200 function disconnects the ballast circuit 50 from the power line 52 through the switch 420 when there is not enough voltage present (72V for a 120V line) to charge the battery charger. It also connects just one of the two lamps 56 to the controllable RF inverter 400 when the power line voltage is below 72V.

Associated with the power factor corrected ballast circuit there is an overload sensing 58 function and an end of life sensing function 60. The circuit drives two lamps normally, but only one in a power outage emergency.

Figure 2:
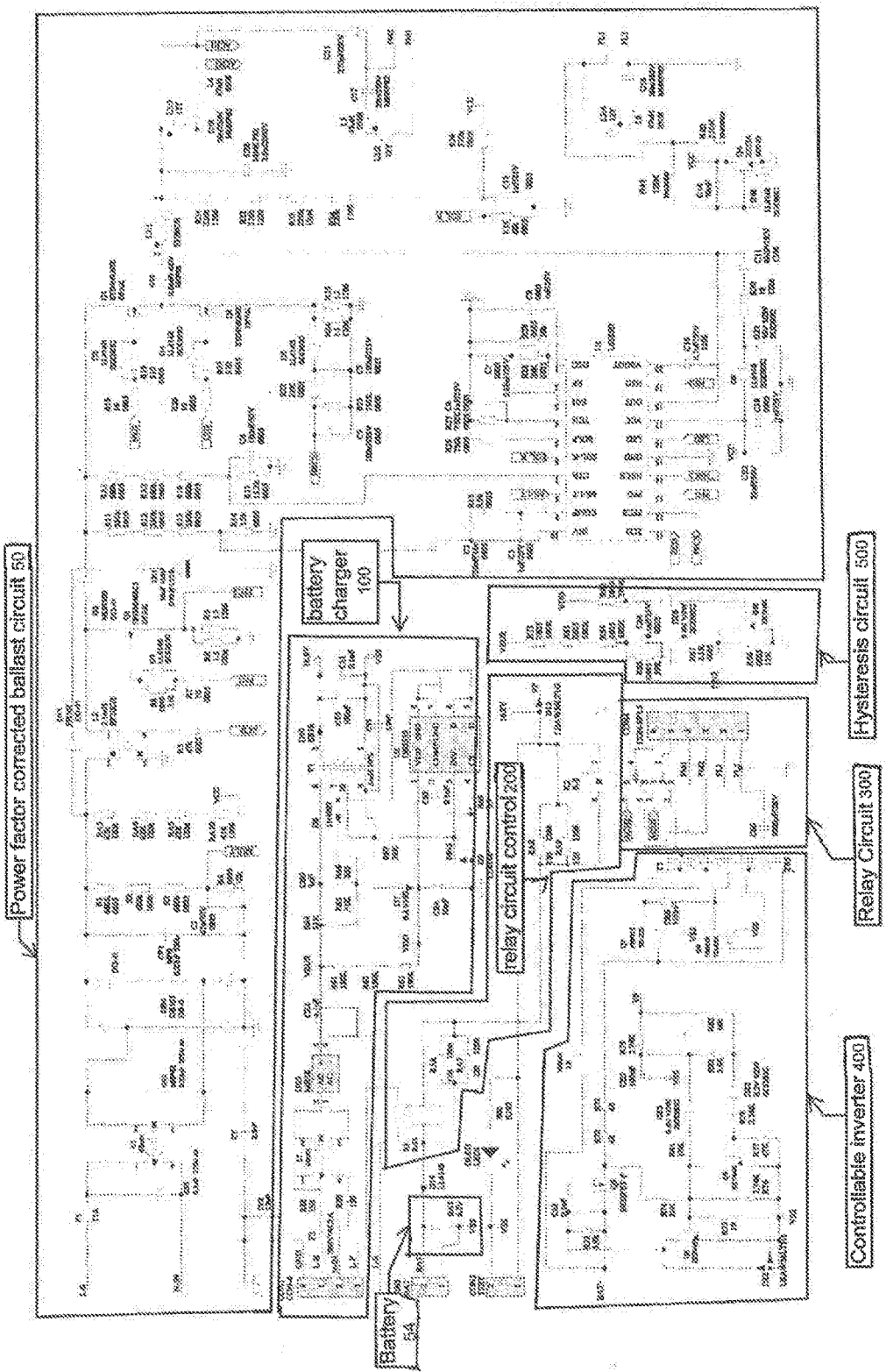
FIG. 2 is a circuit diagram of an example circuit with blocks corresponding to FIG. 1.
Figure 3:
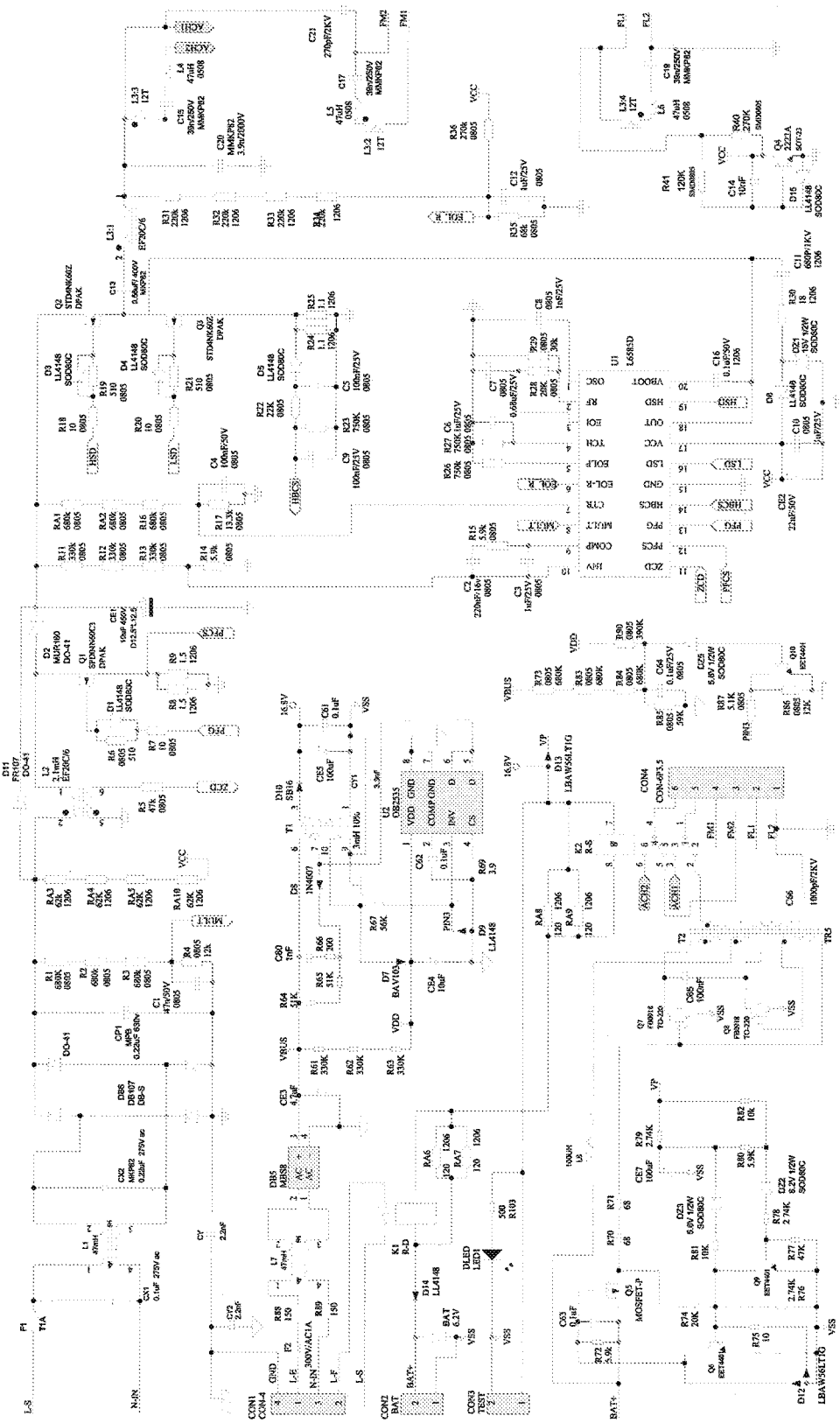
FIG. 3 is the circuit diagram of FIG. 2 without the blocks corresponding to FIG. 1.

FIG. 2 shows a schematic of an embodiment of the inventions with the circuit blocks of FIG. 1 identified. The main part of this circuit consists of the power factor corrected ballast circuit 50 using the L6585D chip. As already mentioned, this circuit provides power factor correction with an active boost stage, and drives two lamps with a series resonant, parallel loaded configuration. The features of this circuit mostly correspond to the previously mentioned application note. L3 is the resonant inductor and C20 is the resonant capacitor. An end of life circuit comprising R31-R35 and capacitor C12 provides a voltage which becomes either too high or too low if the lamps are rectifying, and provides a signal to the EOL R pin of the control chip which will shut the chip down if the voltage is either too high or too low. The circuitry associated with Q4 will shut down the control chip by short circuiting VCC if the voltage across the output inductor L3 becomes too high, as when a lamp is removed, for example. Ail the other features of this block are conventional as described in the L6585 data sheet except for the fact that the input is provided through relay K1 which will disconnect the ballast circuit 50 if the battery charger ceases to charge, as is described below.

The battery charger block 100 uses the OB2535 chip as described in the commonly-available application note for the OB2535. The battery charger block 100 has two outputs. The output labeled 16.8V is either 16.8V or about 7V, depending on whether the line voltage is above or below 72V in. The output labeled VDD is either about 15V or about 10 6V, corresponding to the two possible values of the 16.8V output. The control circuitry for the battery charger embodies a hysteresis function to prevent its outputs from noisily switching between the two possible levels in the event of a noisy power line. This function uses Q10 which is turned on by the rectified power line voltage Vbus. When Vbus goes above 120V, Q10 turns on leaving 15 R87 to control the output voltage which rises to 16.8V on node Vp and 15V on VDD. The increasing Vdd voltage applied through R90 turns on Q10 even harder to lock the hysteresis circuit 500 in this state. When the input voltage decreases and gets down to 72V, the sequence reverses and Q10 switches off.

The controllable inverter block 400 is a conventional current fed self oscillating inverter as previously explained. It is turned on when current is applied to the base of Q7 and turned off when this current is cut off. The current to Q7 base is controlled by the P channel FET Q5. When the gate voltage of Q5 is low it conducts, and when the gate voltage is at source potential it is off. When the battery is first attached at the factory, nothing happens because Q6 and Q9 are both off. So the circuit can remain charged yet inactive during prolonged shipping and storage. When power line voltage is applied, the battery charger 100 starts up and raises the 16.8V output from zero Volts to 16.8V. This voltage turns on Q9 (via VP in FIG. 2) which holds Q6 off, so the controllable inverter does not start. The voltage from VP passes through relay coils K2 and K1 to charge the battery. Each relay coil drops 5V, providing 6.6V to charge the 6.2V battery. The flow of the current which charges the battery activates K2 and K1, so the lamps are connected to the main ballast, and the main ballast is connected to the power line, for normal operation. Without the flow of current (i.e. when the 16.8V output drops to about 7V), the main ballast 50 is disconnected from the lamps and from the main power line. A diode (not shown hi FIG. 2) has its cathode connected to R80 and its anode connected to the junction between DZ3 and the R79/R80 line. This diode keeps the inverter from oscillating before the relay circuit switches to the AC circuit.

Suppose now that the power line voltage falls below 72V. This will cause Q10 in the hysteresis circuit 500 to switch off, so that VP is sharply dropped from 16.8V to about 7V. This will turn off Q9 (which is fed through an 8.2V Zener) but Q6 will remain activated by the current from the stored charge on CE7 (a 100 μF capacitor), even if VP falls to zero.

Q6 pulls down the gate of Q5, turning it on. The drain of Q5 goes high, driving the base of Q6 through R74, so that Q5 now remains latched on for as long as the power line is low and the battery voltage remains above 4.6V. With Q5 latched on, the controllable inverter runs. Meanwhile, because of the low output value of the 16.8V output (about 7V), the relays K1 and K2 are no longer activated, so the ballast circuit 50 is turned off (disconnected from the line voltage by K1) and the lower lamp is connected to the controllable inverter (by K2) while the upper lamp is shorted. The lower lamp is now powered up by the controllable inverter in instant start mode (by pins 1 & 2 on the connector CON4), while the upper lamp is shorted (by pins 5 & 6 on the connector CON4 by action of the relay K2 connecting ACH1 and ACH2).

When the input voltage rises above 102V, Q10 is turned on again, the 16.8V output resumes its full value of 16.8V, Q9 is turned on so Q6 is turned off, hence Q5 is turned off and the controllable inverter 400 stops. Simultaneously the battery 54 starts charging through K1 and K2, activating these relays to reconnect the ballast circuit 50 to the power line and the lamps to the ballast circuit. The extra charge delivered to Q10 base through R90 from the increased Vdd locks on Q10 so that the input voltage has to fall as low as 72V before the system trips back to the emergency configuration. The voltage from Vp quickly charges up CE7 so that the system is ready for the next emergency operation.

Other components include several diodes having the following functions. Diode D11 is to bypass boost inductor L2 to prevent saturation at turn on. Initial start up of the ballast chip U1 is achieved by current though RA3, RA4, RA5 and RA10 charging up CE2. After that VCC power is provided by the charge pumping action of C11 on D6 and DZ1. R30 prevents excessive current surges and C10 bypasses high frequency noise which CE2 does not handle well. The Q4 circuit picks up AC voltage from L3:4, and rectifies it into the base of Q4. If the voltage from L3:4 becomes excessive, indicating a lamp out condition, then Q4 is turned on "crowbarring" the VCC circuit and temporarily stopping the entire action of the ballast. Resistors RA6 and RA7, RA8 and RA9 are just to damp inductive kick back from the relay inductor coils and prevent ringing. D12 protects Q6 when there is a reverse voltage. For example, when the ballast switches from DC to AC, a reverse voltage occurs on the circuit. Also, when the battery is unplugged while DC was operating, there is a reverse voltage due to L8.

Having thus described several exemplary implementations, it will be apparent that various alterations and modifications can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A ballast assembly comprising:
    a ballast circuit to supply power to a load, wherein the ballast circuit is supplied with a line voltage via a switch;
    a battery charger circuit to charge a battery, wherein the battery charger circuit is coupled to the battery and the switch;
    a controllable inverter coupled to the battery, the battery charger circuit, and the load, wherein the controllable inverter includes a storage device, wherein the controllable inverter:
        (1) does not supply power to the load before the storage device is changed from a first state to a second state by the battery charger circuit once the battery charger circuit is first energized by the line voltage;
        (2) does not supply power to the load when the battery charger circuit supplies a first voltage to the controllable inverter; and
        (3) supplies power to the load when after the storage device is in the second state the battery charger circuit supplies a second voltage to the controllable inverter.

2. The ballast assembly of claim 1, wherein the storage device comprises a capacitor, wherein the first state of the capacitor is a substantially discharged state, and wherein the second state of the capacitor is a charged state.

3. The ballast assembly of claim 1, wherein the battery charger circuit (1) supplies the first voltage to the controllable inverter when the battery charger circuit senses that the line voltage is above a first level and (2) supplies the second voltage to the controllable inverter when the battery charger circuit senses that the line voltage has fallen from above the first level to below a second level.

4. The ballast assembly of claim 3, wherein when the battery charger circuit supplies a second voltage to the controllable inverter, the battery charger circuit outputs a signal that causes the switch to cut the line voltage to the ballast circuit.

5. The ballast assembly of claim 3, wherein the first level of the line voltage is higher than the second level of the line voltage, and wherein the first and second levels of the line voltage are separated by a plurality of volts to provide hysteresis.

6. The ballast assembly of claim 1, further comprising a first relay and a second relay.

7. The ballast assembly of claim 1, wherein the load comprises a lamp.

8. The ballast assembly of claim 1, wherein the load comprises a plurality of lamps.

9. The ballast assembly of claim 6, wherein the load comprises a plurality of lamps and wherein the second relay couples the controllable inverter to a single lamp of the plurality of lamps.

10. The ballast assembly of claim 1, wherein the battery is a precharged battery.

11. A method comprising:
    coupling a charged battery to a battery charger circuit and a controllable inverter of a ballast assembly before supplying line voltage to the battery charger circuit and a ballast circuit of the ballast assembly, wherein the ballast circuit and the controllable inverter are coupled to a load;
    having the controllable inverter not supply power to the load before a storage device of the controllable inverter is changed from a first state to a second state by the battery charger circuit once the battery charger circuit is coupled to a line voltage;
    having the controllable inverter not supply power to the load when the battery charger circuit supplies a first voltage to the controllable inverter;
    having the controllable inverter supply power to the load when after the storage device is in the second state the battery charger circuit supplies a second voltage to the controllable inverter.

12. The method of claim 11, wherein the battery charger circuit (1) supplies the first voltage to the controllable inverter when the battery charger circuit senses that the line voltage is above a first level and (2) supplies the second voltage to the controllable inverter when the battery charger circuit senses that the line voltage has fallen from above the first level to below a second level.

13. The method of claim 11, wherein when the battery charger circuit supplies a second voltage to the controllable inverter, the battery charger circuit outputs a signal that causes a switch to cut off the line voltage to the ballast circuit.

14. The method of claim 12, wherein the first level of the line voltage is higher than the second level of the line voltage, and wherein the first and second levels of the line voltage are separated by a plurality of volts to provide hysteresis.

15. The method of claim 11, wherein the load comprises a lamp.

* * * * *